Patented June 10, 1952

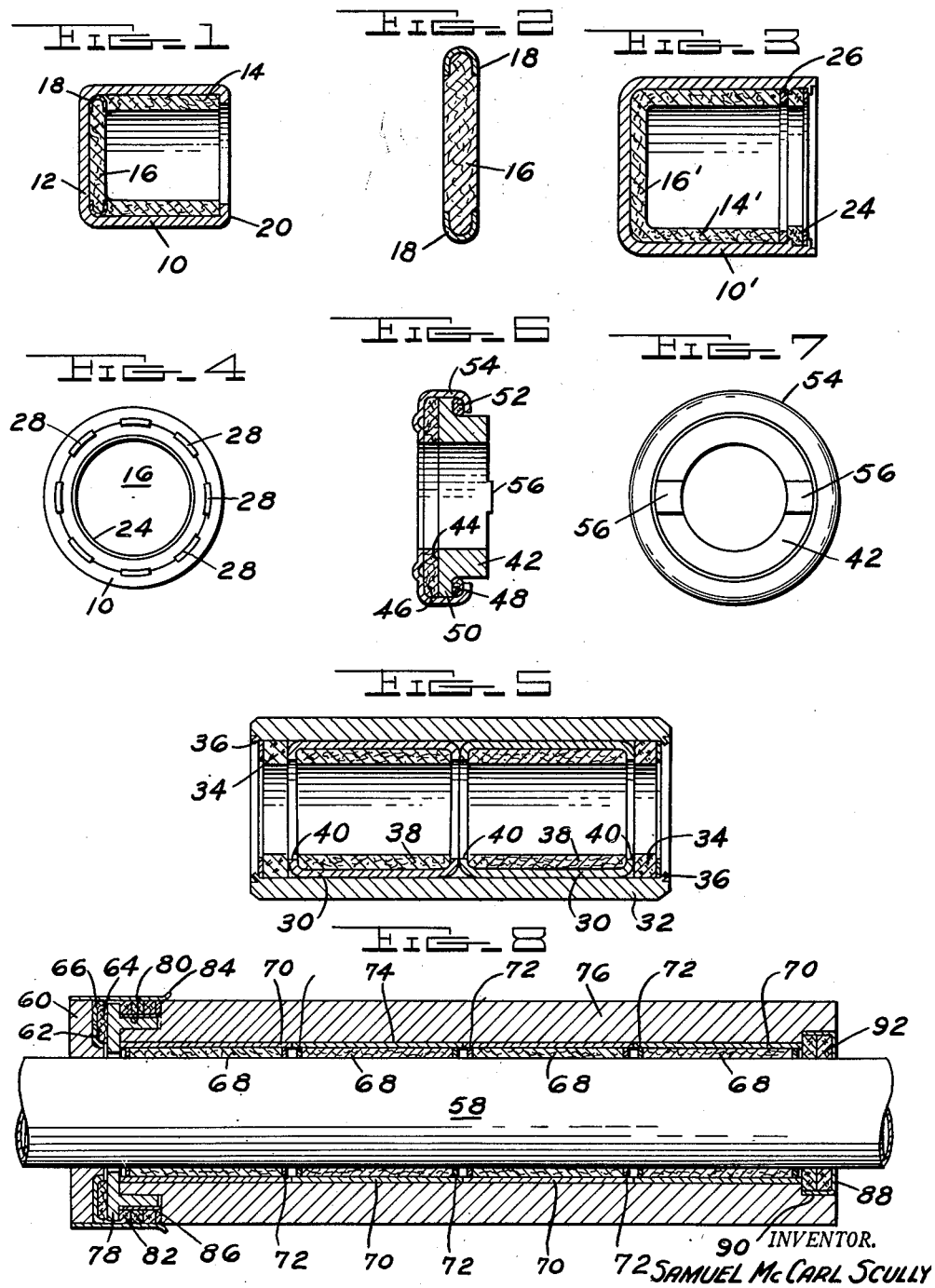

2,600,079

UNITED STATES PATENT OFFICE 2,600,079

HARDENED SELF-LUBRICATING RADIAL AND THRUST BEARING

Samuel McCarl Scully, Pleasant Ridge, Mich., assignor to O. & S. Bearing Company, Detroit, Mich., a corporation of Michigan Application September 26, 1946, Serial No. 699,435

2 Claims. (Cl. 308—237)

This invention relates to a hardened self-lubricating radial and thrust bearing and particularly to one of the oscillating type in which the bearing material is formed from a fibrous substance impregnated with a lubricant. In my application Serial No. 568,089 filed December 14, 1944, now Patent No. 2,560,133, dated July 10, 1951, I have disclosed a bearing in which the compression treatment of the lubricant impregnated fibrous material provides an improved compact surface which expands as it wears and materially increases the life and load carrying characteristics of the bearing. Briefly, the method there disclosed comprises precompressing and preshaping the bearing material under heavy pressure so as to produce a compact homogeneous mass which is self-lubricating throughout its life.

An object of the present invention is to provide a bearing for carrying both radial and thrust loads of an oscillating nature in which the materials produced by the method of my copending application may be utilized with maximum efficiency and facility. I have found that by proper selection of the lubricant with which the fibrous material is impregnated and of the degree of compression imparted to the material in various parts of the bearing that friction may be very greatly reduced and the life and load capacity of oscillating bearings increased significantly beyond the values heretofore attained.

Figure 1 is a longitudinal sectional view of a combined radial and thrust bearing incorporating one from of the present invention.

Figure 2 is a sectional view of one element of the bearing of Figure 1.

Figure 3 is a longitudinal sectional view of a bearing incorporating a second form of the invention.

Figure 4 is an end view of the bearing of Figure 3.

Figure 5 is a longitudinal section of a bearing incorporating a third form of the present invention.

Figure 6 is a longitudinal section of a thrust bearing incorporating a fourth form of the present invention.

Figure 7 is an end view of the bearing of Figure 6.

Figure 8 is a longitudinal section of a high capacity bearing incorporating a fifth form of the present invention.

Referring now to Figure 1, there is shown a steel cup 10 having tubular walls which are joined by a flat end 12. The cup incloses a tube 14 of compressed fibrous material impregnated with a lubricant and formed in the manner disclosed in my aforesaid application. For example, the tube 14 may comprise a length of cotton wicking impregnated with a fatty acid lubricant of any of the types set forth in the patent to Delph 2,379,478 which is placed inside of the cup 10 and a mandrel placed inside the tube 14. The latter is then compressed substantially 35 per cent of its original volume either by drawing the cup 10 through swaging dies or preferably by compressing the tube 14 axially by means of suitable pressing dies. The result is a precompressed and prehardened bushing which tends to retain its finished size and shape after the mandrel is removed and which in distinction to other bearings in this class does not require a journal to be permanently associated with it at the time of manufacture.

For the purpose of receiving end thrust, there is mounted against end wall 12 a disk 16 of similar material to the tube 14. The disk is provided with a suitable metal bezel 18 which surrounds its periphery and is crimped over the edges of the disk 16 to prevent fraying of the fibrous material. The disk 16 may be formed in pressing dies and may be compressed to a greater or less degree relative to the compression of the tube 14. For one application, it has been found that approximately 20 per cent compression of the disk 16 is desirable. The disk 16 may be inserted prior to insertion of the tube 14 in manufacture in which case compression of the tube in an axial direction is desirable. On the other hand, the disk may be made of smaller diameter and inserted in place after the tube 14 is formed.

A bearing of this character is eminently suited for carrying radial and thrust loads of an oscillating nature. Where the radial load is greater in pounds per square inch of bearing area, it is preferred to form the tubular portion with higher compression than the disk portion. Where the load relations are reversed, the compression may be reversed. After the final formation of the bearing, the open end of the cup 10 is crimped inwardly as indicated at 20 to retain the bearing material in place and to maintain its precompressed shape.

It will be seen that the bearing assembly thus provides a readily handled unit which may be used in the manufacture of such things as motor vehicle chassis with great facility and may be assembled to its cooperating journal at any time after manufacture. Likewise, its load capacity and life are greatly increased over previous self-lubricating non-metallic bearings.

Referring now to Figure 3, a similar bearing is there illustrated with the addition of a seal against the entrance of dirt. For this purpose the cup 10' is provided with an enlarged counterbore at its open end for the reception of a sealing ring 24 of granular cork compound. If desired, the cork compound may also be impregnated with a lubricant and precompressed a limited amount during manufacture. A compression of approximately 15 per cent has been found suitable for this purpose. The cork is separated from the tube 14' by a separator washer 26 and is retained in place by staking at intervals around the periphery as shown at 28. The staking acts to hold the sealing ring 24 in place and also through the medium of the separator washer 26 serves to maintain the liner 14' in position.

In this form of bearing the end disk 16' is formed integrally with the tube portion 14 and the two are compressed together in the cup 10 by either axial compression or radial swaging or a combination of the two.

In the form of the invention shown in Figure 5, steel sleeves 30 are pressed into a supporting tube 32 and retained in position by cork seals 34 at either end which are staked in place at 36. The steel tubes 30 are provided with liners of bearing material 38 which are formed in a manner similar to those previously described. The ends of the tubes 30 are then crimped as indicated at 40 to retain the bearing tubes in position. A bearing of this type is well suited for carrying purely radial loads on a journal extending from the bearing at both ends.

Referring now to Figures 6 and 7, a thrust bearing is there disclosed in which a flanged metal tube 42 has a bearing face 44 against which an annulus 46 of similar compressed bearing material is adapted to rotate. The outer face 48 of the flange 50 is also provided with a ring 52 of bearing material and the two bearing rings are retained in place by a cup 54 of sheet metal crimped around the ring 52. The cup 54 may be pressed in a suitable bore and the sleeve 42 attached to a suitable journal. Tongues 56 are provided for interlocking connection with the journal.

Thus, in this form of the invention, the thrust loads are carried on the annulus 46 while the ring 52 serves to retain the main bearing faces in engagement against accidental displacement.

Referring now to Figure 8, there is illustrated a more complex form of bearing particularly adapted for such applications as the suspensions of tracklaying vehicles. In this form the pin 58 is provided with a flange 60 keyed thereto and having a recess 62 for the reception of an annulus 64 of compressed bearing material similar to that previously described. If desired, the annulus 64 may be received in an annular sheet metal cup 66. Considering the shaft as stationary, the rotating part of the bearing comprises a plurality of tubes 68 which may be similar to the tubes 38 of Figure 5 and are retained in sheet metal sleeves 70. The latter have pressed in retainer washers 72 at each end.

The tubes 70 are pressed in a bore 74 of the rotating member 76. The latter may have a ring 78 at its left-hand end having a finished end face adapted to co-act with the face of the bearing annulus 64. The ring 78 also has a recess 80 adapted to receive a cork seal 82, the outer face of which rubs against the inner wall of a sheet metal sleeve 84 pressed on the ring 60.

The seal 82 may comprise a plurality of cork rings retained in position by a sheet metal ferrule 86 pressed in the recess 80. At its right-hand end a similar ferrule 88 is placed in a counterbore 90 to retain cork sealing rings 92 in place where their inner faces may seal the periphery of the shaft 58.

Thus, in this form there is provided a plurality of tubular precompressed and preshaped bearing elements for carrying the radial load together with an annular bearing element carrying the thrust load. At the same time, the bearings are sealed against entrance of dirt by the cork seals 82 and 92.

I claim:

1. A self-lubricating bearing of the oscillating type comprising a tube of fibrous material impregnated with a lubricant and having inner and outer surfaces one of which is subject to bearing motion, said tube being precompressed axially to retain its size under no load at said one surface, an end thrust bearing comprising a disc of fibrous material impregnated with a lubricant and a rigid annular retainer surrounding the edge of the disc to prevent fraying, said disc being positioned co-axially with and at one end of said tube whereby said retainer bears against the end of the tube, and a shell retainer enclosing said annular retainer, the outside of said tube, and a portion of the other end of said tube, to retain the tube under axial compression against said annular retainer.

2. A self-lubricating bearing of the oscillating type comprising a tube of fibrous material impregnated with a lubricant and having inner and outer surfaces, one of which is subject to bearing motion, an end thrust bearing comprising a disk of fibrous material impregnated with a lubricant, a rigid annular retainer surrounding the edge of the disk to prevent fraying, said disk having a diameter substantially equal to the diameter of the tube, and a cup-shaped housing receiving said disk at its bottom end and enclosing said tube in its walls, one end of said tube abutting against the edges of said disk, said tube being precompressed axially to retain its size under no load at said one surface, and the open end of said cup being formed inwardly to furnish support for a portion of the other end of said tube to hold the same in the compressed condition.

SAMUEL McCARL SCULLY.

REFERENCES CITED

The following references are of record in the file of this patent:

UNITED STATES PATENTS

| Number | Name | Date |
| --- | --- | --- |
| 499,012 | Cooper | June 6, 1893 |
| 1,141,974 | Obrecht | June 8, 1915 |
| 1,618,877 | Henry | Feb. 22, 1927 |
| 1,817,529 | Skillman | Aug. 4, 1931 |
| 1,829,574 | Skillman | Oct. 27, 1931 |
| 1,898,100 | Skillman | Feb. 21, 1933 |
| 1,936,863 | Skillman | Nov. 28, 1933 |
| 1,960,956 | Riedel | May 29, 1934 |
| 2,027,560 | Skillman | Jan. 14, 1936 |

FOREIGN PATENTS

| Number | Country | Date |
| --- | --- | --- |
| 494,544 | France | Sept. 11, 1919 |